(12) United States Patent
Dunn

(10) Patent No.: US 10,546,053 B2
(45) Date of Patent: Jan. 28, 2020

(54) SEMI-AUTOMATED FIELD PLACEMENT FOR ELECTRONIC FORMS

(71) Applicant: Citrix Systems, Inc., Fort Lauderdale, FL (US)

(72) Inventor: Cary Dunn, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 256 days.

(21) Appl. No.: 15/158,249

(22) Filed: May 18, 2016

(65) Prior Publication Data

US 2017/0337172 A1    Nov. 23, 2017

(51) Int. Cl.
*G06F 17/00* (2019.01)
*G06F 17/24* (2006.01)

(52) U.S. Cl.
CPC .................. *G06F 17/243* (2013.01)

(58) Field of Classification Search
CPC .. G06F 17/243; G06F 3/0482; G06F 3/04845; G06F 3/0488; G06F 3/04812; G06F 3/0484; G06F 17/24; G06F 17/212; G06F 17/30011; G06T 11/001; G06Q 10/10
USPC ........................................................ 715/222
See application file for complete search history.

(56) References Cited

U.S. PATENT DOCUMENTS

| | | |
|---|---|---|
| 9,594,739 B2 | 3/2017 | Dunn et al. |
| 9,596,236 B2 | 3/2017 | Dunn et al. |
| 2006/0095844 A1* | 5/2006 | Van Leeuwen ....... G06F 3/0236 715/700 |
| 2009/0217168 A1* | 8/2009 | Dexter .............. G06F 17/30675 715/731 |
| 2011/0040604 A1* | 2/2011 | Kaib ...................... G06Q 30/02 705/7.37 |
| 2011/0093769 A1 | 4/2011 | Dunn et al. |
| 2011/0093807 A1 | 4/2011 | Dunn et al. |
| 2011/0138271 A1* | 6/2011 | Tobita ..................... G06T 11/60 715/246 |
| 2014/0310582 A1* | 10/2014 | Bardman ............... G16H 10/20 715/222 |
| 2014/0344731 A1* | 11/2014 | Holz ................... G06F 3/04812 715/764 |
| 2015/0178252 A1 | 6/2015 | Dunn et al. |
| 2015/0244830 A1* | 8/2015 | Rietveld ................. G06F 16/00 715/745 |
| 2016/0041957 A1* | 2/2016 | Finsterwald .......... G06F 3/0484 715/202 |
| 2017/0140241 A1* | 5/2017 | Maloney .............. G06K 9/4652 |

* cited by examiner

*Primary Examiner* — Jason T Edwards
(74) *Attorney, Agent, or Firm* — BainwoodHuang

(57) ABSTRACT

A technique for inserting form fields into forms displays a cursor superimposed over a background image of a form and dynamically generates candidate shapes of a form field to be inserted. New candidate shapes are generated automatically, based on pixel content of the form under a cursor, as a user moves the cursor over different regions of the form. In response to the user manually selecting one of the candidate shapes, the technique establishes the position, size, and shape of the form field based on the position, size, and shape of the selected candidate shape. The improved technique thus proceeds semi-automatically, generating candidate shapes automatically but based on manual, user-directed cursor positioning and manual selections.

22 Claims, 6 Drawing Sheets

410N

For the year Jan. 1–Dec. 31, 2000, or other tax year

Your first name and initial     420

410W  410S   330   410E  — 310a

If a joint return, spouse's first name and initial

FIG. 4

For the year Jan. 1–Dec. 31, 2000, or other tax year — 310a

Your first name and initial

510

If a joint return, spouse's first name and initial

FIG. 5

For the year Jan. 1–Dec. 31, 2000, or other tax year  
Your first name and initial  
610W  330  610E  
610S  
610N  
310a  
If a joint return, spouse's first name and initial

*FIG. 6*

For the year Jan. 1–Dec. 31, 2000, or other tax year —310a  
Your first name and initial  
710  
If a joint return, spouse's first name and initial

For the year Jan. 1–Dec. 31, 2000, or other tax year
Your first name and initial                    830
810W    330       810E          820
If a joint return, spouse's first name and initial
— 310a

FIG. 9

For the year Jan. 1–Dec. 31, 2000, or other tax year — 310a
Your first name and initial    910a    830
910
910b
If a joint return, spouse's first name and initial

FIG. 10

1014
For the year Jan. 1–Dec. 31, 2000, or other tax year
Your first name and initial             1010b
1010a    330a  1016  330b
If a joint return, spouse's first name and initial
1012
— 310a

US 10,546,053 B2

SEMI-AUTOMATED FIELD PLACEMENT FOR ELECTRONIC FORMS

BACKGROUND

In conducting electronic communications and commerce, individuals and organizations may wish to convert paper or electronic documents into fillable forms, which they can distribute electronically to allow others to complete and/or sign quickly and conveniently. For example, a person may scan a paper document, save the scanned document as a PDF (Portable Document Format) file, and add form fields using a PDF editor. One may also print or save a word processing document, or other electronic document, as a PDF file, and add form fields to the resulting file. As is known, form fields are active regions in an electronic form that allow users to enter data using their computers, smart phones, or other devices. Examples of form fields include textboxes, checkboxes, select boxes, date pickers, and the like.

In some examples, users add form fields to a document manually, e.g., by using a form field tool and drawing fields over the document. In other examples, users may employ automated tools for detecting field locations in the document and inserting form fields without user intervention. For example, Adobe® Acrobat® provides an auto-detect form fields feature that automatically detects and inserts form fields into documents.

SUMMARY

Unfortunately, the above-described manual approach for inserting form fields into documents can be tedious and time-consuming, especially when many form fields are required. For example, for each form field to be added, a user may position and size the form field at the appropriate location relative to the document. Such activity may require focused concentration and many fine adjustments. Automatic detection of form fields can be much faster, but it often makes mistakes, placing form fields where they should not be and failing to place them where they should. Automatic detection may also insert form fields with improper sizes and/or shapes. Thus, even when fully automatic field detection is used, much work often remains for the user after the fact, again, consuming valuable time and attention of the user.

In contrast with the above-described approaches, an improved technique for inserting form fields into forms displays a cursor superimposed over a background image of a form and dynamically generates candidate shapes of a form field to be inserted. New candidate shapes are generated automatically, based on pixel content of the form under a cursor, as a user moves the cursor over different regions of the form. In response to the user manually selecting one of the candidate shapes, the technique establishes the position, size, and shape of the form field based on the position, size, and shape of the selected candidate shape. The improved technique thus proceeds semi-automatically, generating candidate shapes automatically but based on manual, user-directed cursor positioning and manual selections, thus allowing a user to avoid the tedium of manual field entry while also avoiding the errors associated with fully-automated field detection.

Certain embodiments are directed to a method of providing one or more form fields in an electronic form. The method includes displaying, by a computing machine, a cursor superimposed on a background image of the electronic form, the cursor having a cursor position that changes, relative to the background image, in response to a user operating a pointer of the computing machine. The method further includes dynamically displaying, by the computing machine, candidate shapes of a form field in response to the user changing the cursor position relative to the background image. The candidate shapes generated by the computing machine are based on pixel values of the background image in a vicinity of the cursor position and change as the cursor position changes. In response to receiving user input that identifies a selected one of the generated candidate shapes, the method further comprises establishing a position, size, and shape of the form field in the electronic form based on a position, size, and shape of the selected candidate shape.

Other embodiments are directed to a computing machine constructed and arranged to perform acts for providing one or more form fields in an electronic form, such as the acts of the method described above. Still other embodiments are directed to a computer program product. The computer program product stores instructions which, when executed on control circuitry of a computing machine, cause the computing machine to perform a method of providing one or more form fields in an electronic form, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

FIG. 4 is a magnified view of the display output of FIG. 3 and shows example activities for defining boundaries of a candidate shape of a form field based on pixels of the background image in the vicinity of a current cursor position;

FIG. 5 is the same magnified view as in FIG. 4 and shows a resulting candidate shape generated from the activities of FIG. 4;

FIG. 6 is the same magnified view as in FIG. 4 and shows example activities for defining boundaries of another candidate shape based on pixels of the background image in the vicinity of a new cursor position;

FIG. 7 is the same magnified view as in FIG. 6 and shows the candidate shape generated from the activities of FIG. 6;

FIG. 8 is the same magnified view as in FIG. 4 and shows example activities for defining boundaries of yet another candidate shape based on pixels of the background image in the vicinity of yet another cursor position;

FIG. 9 is the same magnified view as in FIG. 8 and shows the candidate shape generated from the activities of FIG. 8;

FIG. 10 is the same magnified view as in FIG. 8 and shows candidate shapes and cursor images changing dynamically as cursor position is changed relative to the background image of the form.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for inserting form fields into forms includes displaying a cursor superimposed over a background image of a form and dynamically displaying candidate shapes of a form field to be inserted. New candidate shapes are generated automatically, based on pixel content of the form under a cursor, as a user moves the cursor over different regions of the form. In response to the user manually selecting one of the candidate shapes, the technique establishes the position, size, and shape of the form field based on the position, size, and shape of the selected candidate shape.

Figure 1:
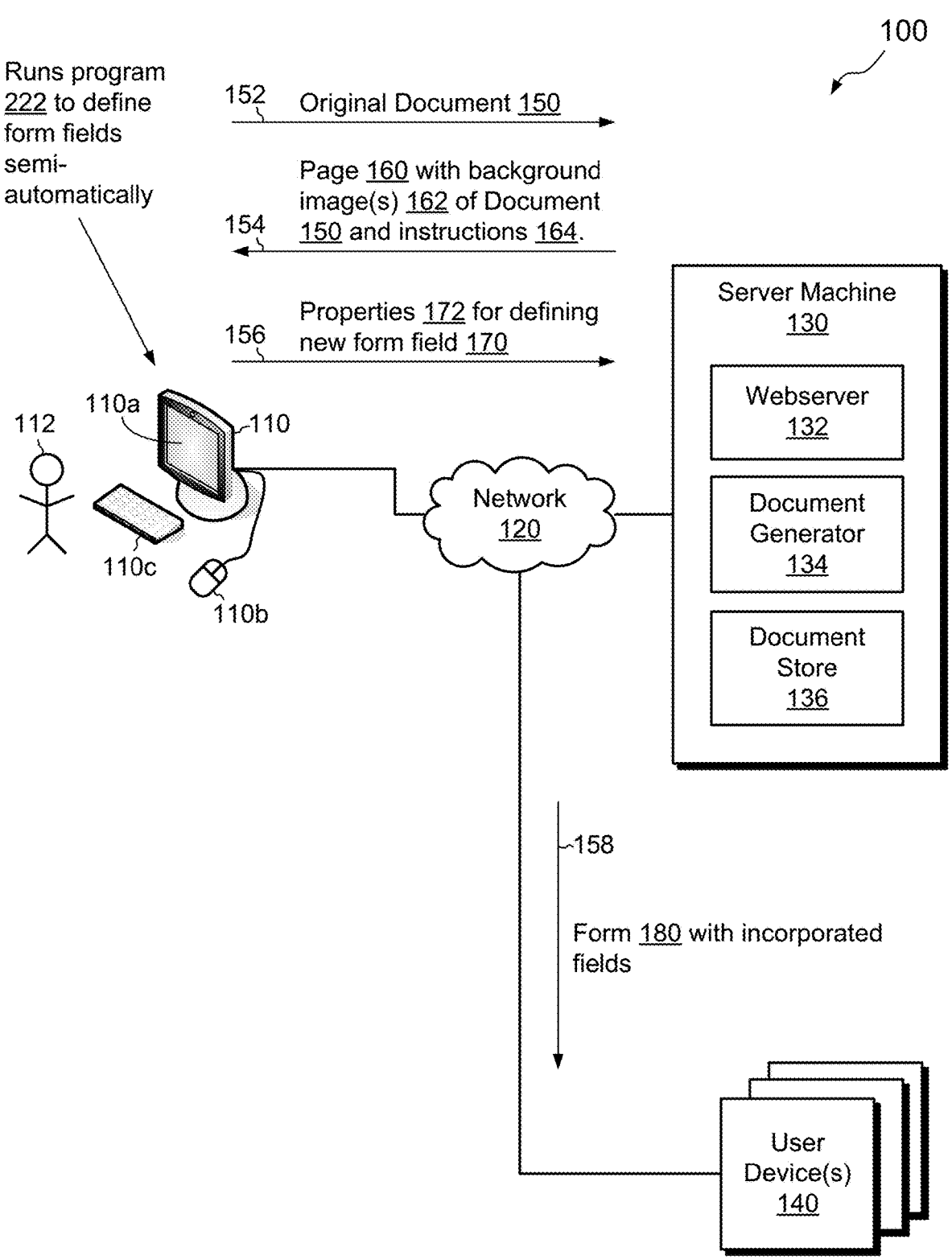
FIG. 1 is a block diagram of an example environment in which embodiments of the improved technique hereof can be practiced.

FIG. 1 shows an example environment 100 in which embodiments of the improved technique hereof can be practiced. In the example shown, a computing machine 110 connects to a server machine 130 over a network 120, such as a LAN (Local Area Network), WAN (Wide Area Network), and/or the Internet, or example. A user 112, e.g., a human user, operates the computing machine 110, which is seen to include a display 110a, a pointer 110b (e.g., a mouse, trackpad, touchpad, touchscreen, etc.), a keyboard 110c, and other components described in more detail below. Although the computing machine 110 of FIG. 1 has the form of a desktop computer, it may alternatively be provided as a laptop computer, tablet, smart phone, personal data assistant (PDA), workstation, or any other machine capable of running applications and receiving pointer input from user 112. When provided as a tablet, smart phone, or the like, the computing machine may include a touchscreen, which may serve as display 110a, pointer 110b, and keyboard 110c, all in one. As will be described, the computing machine 110 is constructed and arranged to respond to input from user 112 by semi-automatically defining form fields to be inserted into form documents.

As further shown in FIG. 1, server machine 130 includes a webserver 132, a document generator 134, and a document store 136. In this example, the server machine 130 is configured as a document server, which enables users to create documents having defined form fields, store the documents, and distribute the documents to receiving users, e.g., users of user device(s) 140. Such receiving users may fill out the documents electronically, e.g., by entering text and/or graphics into the document's predefined form fields and submitting the completed documents to the server machine 130. In some examples, the form fields in the documents collect not only text and/or graphics but also signatures. In such cases, the server machine 130 is further configured to securely and accurately manage a signing process for documents. Although the server machine 130 is shown as a single element, it should be appreciated that the server machine 130 may be realized with multiple computers, which work cooperatively to carry out the functions described.

In example operation, the user 112 runs a program 222 on the computing machine 110 that allows the user to define form fields semi-automatically. The program 222 may be provided as a web browser, a web-enabled application or app, or any other application, process, plug-in, service, or the like. User 112 interacts with the program 222 to identify an electronic document 150 that the user wishes to render as a fillable form. For example, the user 112 clicks a button or link, rendered by the program 222, which enables the user 112 to browse a local file system for the desired document. The document 150 may be any type of document capable of being displayed or printed by a computer, such as a PDF file, text file, word processing document, spreadsheet, presentation, web page, picture, graphics file, CAD (Computer Aided Design) rendering, or any other displayable or printable document or file. In some examples, the document 150 may originally exist in paper form, provided the paper document is scanned or photographed and stored in electronic form.

As indicated by arrow 152, the program 222 sends the selected document 150 to the server machine 130. The server machine 130 receives the document 150, and the document generator 134 processes the document 150 to render the document in pages (if not already page-delimited) and to render each page in a graphical image format, such as a BMP, PNG, GIF, TIFF, JPEG, or the like. The document generator 134 thus renders each page of the document 150 as a respective image containing a two-dimensional array of pixels.

In an example, the document generator 134 renders each pixel in each page image in a format that allows a lightness value to be identified. For example, pixels may be rendered in HSL (Hue, Saturation, Lightness) format, with a lightness value of each pixel being a directly-readable property. HSL format is not required, however. Although definitions of color information can be highly technical, specific, and can vary, it should be appreciated that "lightness" as used herein refers generally to whether a pixel is light, dark, or somewhere in between. If the lightness of a pixel is not directly provided, but its "luminance" or "brightness" is, then such luminance or brightness may be used herein as a measure of lightness, even though experts may draw find distinctions between the meanings of these terms. In some examples, the lightness of a pixel may be regarded simply as a pixel's equivalent grayscale value.

With each page of the document 150 rendered as a graphical image, the webserver 132 generates a webpage 160 or other output that includes one or more images of pages of the document 150 as one or more respective background images 162. In an example, the webserver 132 provides each background image 162 in the webpage 160 as a respective "canvas" element, as defined by HTML5 (HyperText Markup Language, Version 5). The webpage 160 also includes instructions 164 for defining form fields relative to the background images 162. In an example, the instructions 164 are provided as JavaScript code, which the program 222 on the computing machine 110 can execute to enable the user 112 to define form fields semi-automatically.

As indicated by arrow 154, the program 222 on the computing machine 110 downloads the webpage 160 from the webserver 132 and displays the webpage 160 on the display 110a. User 112 then operates the program 222 to define form fields to be applied to the image-rendered page(s) of the document 150. For example, and as will be described more fully below, the user 112 selects a form-field type (e.g., textbox, checkbox, etc.) and moves a cursor over a background image that shows a page of the document 150. As the user 112 moves the cursor, e.g., by operating the mouse 110b, the program 222 automatically generates candidate shapes for the specified form-field type. For example, moving the cursor over a white area may cause the program 222 to display a ghost image of a textbox that surrounds the cursor. Moving the cursor over a dark horizontal line may cause the program 222 to display a ghost image of a textbox directly above the cursor. More generally, as the user moves the cursor over different regions of the background image, the program 222 displays ghost images, one after another, of different candidate shapes.

When the user 112 sees an appropriate candidate shape, e.g., one that has a desired position, size, and shape relative to the displayed background image 162, the user 112 provides user input, such as a mouse click, keyboard input, etc., to select the currently-displayed candidate shape. Once the user 112 makes a selection, the program 222 establishes properties for a new form field 170 of the specified type. In an example, the definition of the form field 170 sets forth the same relative position, size, and shape as those of the selected candidate shape, although small differences may arise based on rounding errors, requirements for margins, padding, etc. In an example, the user 112 may define additional properties for the form field 170, such as a name, default value, and (for a textbox) whether it supports multiple lines of text, for example.

As indicated by arrow 156, the program 222 uploads properties 172 defined for the form field 170 to the server machine 130. These properties 172 include, for example, the relative position, size, and shape of the selected candidate shape, as well as any other properties established by the user 112. In some examples, uploading the properties 172 is performed for multiple form fields at a time, e.g., after the user 112 has finished defining form fields for the fillable form. The server machine 130 receives the properties 172, and the document generator 134 processes the properties 172 to create a new fillable form 180 based on the original document 150. In an example, the document generator 134 defines form fields, such as HTML form elements, having the properties 172 defined by the program 222, and positions the new form fields relative to the background images 162. The document generator 134 may then save the new fillable form 180 in the document store 136.

In an example, the program 222 expresses the properties 172 for position, size, and shape as percentages relative to the displayed background image 162. For example, the position of a selected candidate shape may be defined as an X-Y coordinate, where X and Y are expressed as percentages of the width and height of the background image 162, respectively, relative to an origin. The origin may be represented by the upper-left-most pixel of the background image 162, for example, or as some other coordinate. Dimensions of form fields may likewise be expressed as percentages of length and width of the background image 162. In some examples, rectangular shapes are assumed for form fields, and the program 222 expresses position, size, and shape using two X-Y coordinates, which represent two opposite rectangular vertices (there is no requirement that position, size and shape be represented by three respective values). In an example, when the document generator 134 configures the form fields that correspond to the selected candidate shapes, the document generator 134 translates the coordinates and dimensions from percentages to pixels, such that the fillable form 180 represents coordinates and dimensions of form fields in numbers of pixels.

As indicated by arrow 158, the server machine 130 may send links pointing to the newly created fillable form 180 to user device(s) 140, e.g., via email, SMS, etc., When a user of each device 140 clicks the link, the new fillable form 180 is displayed. The displayed form includes the background image(s) 162 and has active form fields at the same locations and with the same sizes and shapes relative to the background images 162 as what the user 112 prescribed when selecting the candidate shapes. Each user of a device 140 may then fill out the new form 180, e.g., by entering text and/or graphics into the form fields, and submit the completed form back to the server machine 130, where the completed form may be kept in the document store 136.

Although the example described above involves both the computing machine 110 and the server machine 130, similar activities may be conducted entirely on the computing machine 110, such that the server machine 130 is not required. For example, the program 222 may operate independently of the server machine 110, converting the original document 150 into graphical background images itself and/or converting selected candidate shapes into form fields. According to some variants, the user 112 selecting a candidate shape triggers an immediate conversion of the selected shape into a respective form field, which the user 112 may fill out directly. Thus, with this arrangement, it is possible for the user 112 to create a fillable form and fill it out at the same time. It should therefore be appreciated that the detailed example arrangement shown in FIG. 1 is intended to be merely illustrative.

Figures 2, 3:
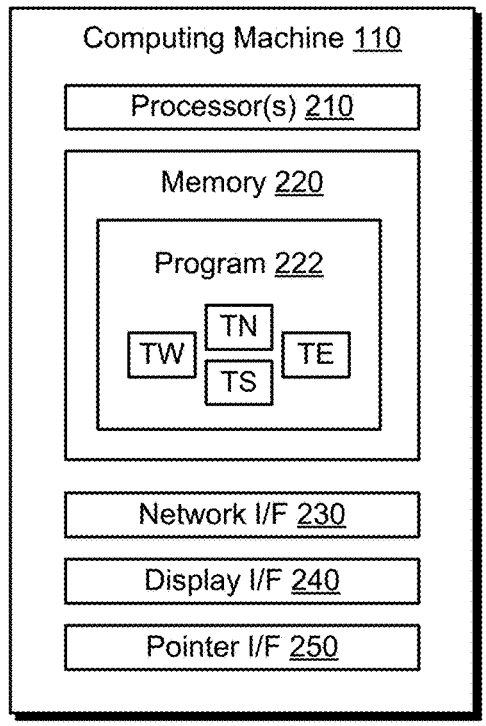
FIG. 2 is a block diagram of an example computing machine as shown in FIG. 1.
FIG. 3 is an example display output of a web browser, application, or app, which runs on the computing machine of FIGS. 1 and 2, for rendering a form as a background image and semi-automatically placing form fields on the form.

FIG. 2 shows an example computing machine 110 of FIG. 1 in additional detail. Here, it is seen that computing machine 110 further includes a set of processors 210, e.g., one or more CPUs, processing chips, and/or processing assemblies, and memory 220, e.g., volatile memory, such as RAM, and non-volatile memory, such as one or more ROMs, magnetic disk drives, solid state drives, and the like. The computing machine 110 may also include a network interface 230, e.g., a network interface card (NIC) for connecting to the network 120 using Ethernet, for example, a display interface 240 for driving the display 110a, and a pointer interface 250 for receiving pointer input from the pointer 110b.

The set of processors 210 and the memory 220 together form control circuitry, which is constructed and arranged to carry out various methods and functions as described herein. Also, the memory 220 includes a variety of software constructs realized in the form of executable instructions. When the executable instructions are run by the set of processors 210, the set of processors 210 is caused to carry out the operations of the software constructs. Although certain software constructs are specifically shown and described, it is understood that the memory 220 typically includes many other software constructs, which are not shown, such as an operating system, various applications, processes, and daemons.

FIG. 2 further shows program 222 (described in connection with FIG. 1) residing in memory 220. In some examples, the program 222 is a web browser capable of displaying the page 160 and receiving input from user 112, e.g., via the mouse 110b (or other pointer device) and/or the keyboard 110c. In other examples, the program 222 is an app or application, which may be web-enabled for communicating with server machine 130, for embodiments that require such communication. However, the program 222 may be provided in any suitable software construct. As will be described in more detail below, some examples of program 222 support multi-threading. For example, if the program 222 runs instructions 164 provided in the form of JavaScript, the program 222 may support web workers, which run as independent JavaScript threads. Four such web workers are shown, TN, TS, TE, and TW. As will be described, these web workers perform processing for the program 222 when scanning pixels in North, South, East, and West directions, respectively, relative to a current cursor position.

FIG. 3 shows an example display output 300 of the program 222. In an example, the computing machine 110 renders the display output 300 on display 110a. User 112 may interact with program 222 via the display output 300 using the mouse 110b, keyboard 110c, and/or other input device. In an example, program 222 is a web browser or other web-enabled application or app and the display output 300 shows a webpage 160.

The display output 300 includes a background image 310, which is a specific instance of the background images 162 described in connection with FIG. 1. Here, the background image 310 is a PNG (Portable Network Graphics) rendering of a first page of a tax form. For example, user 112 may have previously uploaded the tax form (e.g., as a PDF file) to the server machine 130, which converted its pages into respective PNG files and provided them in respective HTML5 canvas elements.

Display output 300 further shows an options window 320, which includes a list of form-field types, such as "Signature Field," "Text Field," "Date Field," and so forth. User 112 may click on a form field type to direct the program 222 to define form fields of the selected type. In the example shown, the user 112 has selected "Text Field," as indicated by the surrounding rectangle. With the "Text Field" selection made, the user 112 may move a cursor 330 over the background image 310 to define text fields to be inserted into an eventual fillable form. The user 112 may define other types of form fields in a similar manner.

FIG. 4 shows a magnified view of a portion 310a of the background image 310 of FIG. 3. Here, cursor 330 is visible over a white space in the background image 310, in an area that includes graphical rendering of text which reads "Your first name and initial."

In response to the user 112 moving the cursor 330 to the indicated cursor location and briefly hovering, the program 222 launches a procedure for generating a candidate shape. In an example, the procedure starts by testing a pixel of the background image 310 directly under the cursor 330 and comparing a lightness of that pixel with a predetermined lightness threshold. In an example, the lightness threshold is set to distinguish white space from darker text and graphics. To provide a non-limiting example, the lightness threshold may be set to a value between the darkest pixel in the background image 310 and the brightest pixel, for instance, at the 90% point. This is merely an example, however. In some examples, the lightness threshold is user-adjustable, e.g., to account for documents that have gray or color backgrounds or text.

In the example shown, the pixel under the cursor 330 exceeds the brightness threshold, so the procedure concludes that the cursor 330 overlies a light space, which is a suitable location for placing a textbox. The procedure then performs processing to identify the extent of the candidate shape, which will eventually surround the cursor 330.

As shown, the procedure sends out tracers that extent away from the current cursor position in multiple directions. The current cursor position may be designated, for example, as the coordinates of the pixel currently underlying the cursor 330 in the background image 310. Four such tracers are shown, extending away from the cursor in the North (410N), South (410S), East (410E), and West (410W) directions. In an example, each tracer proceeds in the respective direction one pixel at a time along a straight line segment. For each pixel encountered, the tracer tests whether the lightness of that pixel exceeds the lightness threshold. If it does, the tracer proceeds to the next pixel and continues. If it does not, the tracer has encountered a dark pixel and stops searching. Rather, the tracer defines a boundary of the candidate shape based on the location of the dark pixel (e.g., at the position of the previous light pixel).

In some examples, the procedure for determining the extent of the candidate shape also tests pixels offset from the straight line segment extending away from the cursor 330 in the respective direction. For example, after testing each N pixels in a straight line segment, the procedure may test M pixels on either side of the line segment, extending perpendicularly away from the line segment, such that pixels are also tested within a predetermined distance 420 of the line segment. The M pixels may be tested in any order. Here, the predetermined distance 420 is the distance represented by M pixels. As was done when testing pixels on the line segments, the tracer defines a boundary of the candidate shape upon encountering the first dark pixel, in this case the first dark pixel from among any group of M pixels tested.

Such testing of offset pixels can help to avoid making candidate shapes too large when the background image 310 includes images of text or other spaced objects. For instance, if not for the testing of offset pixels, the tracer 410N would extend between spaced letters of graphical text (between the "e" in "name" and the "a" in "and") and the resulting candidate shape would encompass the entire text, "Your first name and initial."

Instead, as shown in FIG. 5, the program 222 displays a candidate shape 510, which is the result of the probing procedure shown in FIG. 4. Here, candidate shape 510 is bounded in the East, West, and South directions by dark lines, whose pixels did not exceed the brightness threshold, and is bounded in the North direction by the text, which was only discovered as a result of offset probing.

Although FIGS. 4 and 5 show a particular procedure for identifying a candidate shape, it should be appreciated that other procedures may be used. For example, many techniques are known for determining the extent of a graphical region, including flood fills, zigzag patterns, and so forth. An advantage of the procedure described, however, is that it has been found to be generally accurate for form-like documents and avoids having to test every pixel in an area. Testing fewer pixels allows the program 222 to run much faster than it otherwise might and therefore enables the program 222 to be more responsive to user input.

In an example, processing for tracers 410N, 410S, 410E, and 410W is performed by respective threads, TN, TS, TE, and TW (FIG. 2). In some examples, such threads may be provided as JavaScript web workers.

FIG. 6 shows an example of the same procedure for establishing the extent of a candidate shape as was shown in FIG. 4, except that here the procedure begins from a different cursor position. In this example, the cursor 330 is shown to the right of the graphically-rendered text. Tracers 610N, 610S, 610E, and 610W execute, e.g., in respective threads, to identify the boundaries of a candidate shape.

FIG. 7 shows the result of such processing, i.e., candidate shape 710. It is noted that candidate shape 710 is different from candidate shape 510 (FIG. 5), even though it relates to the same general area of the background image 310. As can be seen, the position, size, and shape of candidate shapes vary in general based on cursor position. This feature affords flexibility to user 112 when defining form fields, as the user is able to select the candidate shape that is best suited for the available space.

FIG. 8 shows a different processing path for the procedure of FIG. 4. In this example, user 112 has positioned the cursor 330 directly over a dark horizontal line segment, i.e., the line segment defining the bottom of the space for entering "Your name and initial." Here, when the procedure tests the pixel directly under the cursor 330, the procedure determines that the lightness of the pixel falls below the lightness threshold. In this event, the program 222 conducts probing in a different manner.

For example, instead of using four tracers, as in the examples provided above, the program 222 uses only two, one for East (810E) and one for West (810W). In an example, the program 222 performs processing for each tracer in a respective thread, using threads (e.g., web workers) TE and TW for tracers 810E and 810W, respectively. The tracers proceed along line segments that extend away from the cursor 330 and perform offset testing to a distance 820 away from the line segments, e.g., by testing M pixels on either side of each line segment for each set of N consecutive pixels tested along the length of the line segment. Here, however, probing continues to a next pixel if the current one is dark (less than the lightness threshold). Otherwise, the probing encounters an end of the line segment and establishes a boundary of the candidate shape based on the position of the light pixel (e.g., at the position of the previous dark pixel). Processing for offset pixels also differs from that described above. Here, such testing checks for a white margin above the line segment. If a white margin is found, probing continues. Otherwise, the probing establishes a boundary of the candidate shape based on the position of the first dark pixel encountered. Proceeding as described, offset testing captures instances where a horizontal line segment being probed crosses a vertical line segment and continues, even though the vertical line segment may mark the end of the input region on the original document. FIG. 8 shows this scenario, as vertical line segment 830 crosses the horizontal line segment and defines a new region of the document. If not for offset testing, the east-most boundary of the resulting candidate shape would extend too far to the right.

Instead, FIG. 9 shows the result of the probing of FIG. 8, where candidate shape 910 does not cross vertical line 830. Although not as consequential, candidate shape 910 also does not cross a thick vertical line on the west-going side, for similar reasons. Rather, candidate shape 910 has a width 910*a* equal to the length of the space between the two vertical lines. In this example, when the cursor 330 hovers over a dark horizontal line segment, the procedure for defining the candidate shape establishes a fixed height 910*b* for the candidate shape, as no vertical probing is performed. It should be appreciated, though, that this is merely a convenient design choice, and that alternative implementations may perform vertical probing and allow for variable heights.

Another example, not shown, is where the cursor 330 is positioned over a dark horizontal line segment (pixels below the lightness threshold) that is surrounded by light space (pixels above the lightness threshold). In such an example, horizontal probing would stop when encountering light pixels in each of the East and West directions. In this example, the width of the resulting candidate shape would be based on (e.g., equal to, or approximately so) the length of the dark horizontal line segment.

FIG. 10 shows an example arrangement for dynamically generating different candidate shapes for a form field in response to the user 112 changing the position of the cursor 330 relative to the background image 310. For example, when the user 112 moves the cursor to a first position 1012 over the dark horizontal line, the program 222 generates candidate shape 1010*a*, which is the same as shape 910 (FIG. 9). However, when the user 112 moves the cursor 330 to a second position 1014 surrounded by light space (in direction 1016), the program 222 generates candidate shape 1010*b*, which is the same as shape 710 (FIG. 7). Additionally, the program 222 displays the cursor 330 with a first cursor image 330*a* when the cursor 330 is positioned over a dark pixel (below the lightness threshold) and to display the cursor 330 with a second cursor image 330*b* when the cursor 330 is positioned over a light pixel (above the lightness threshold). The program 222 thus switches between displaying the first cursor image 330*a* and displaying the second cursor image 330*b* as the user 112 changes the current cursor position relative to the background image 310.

Figure 11:
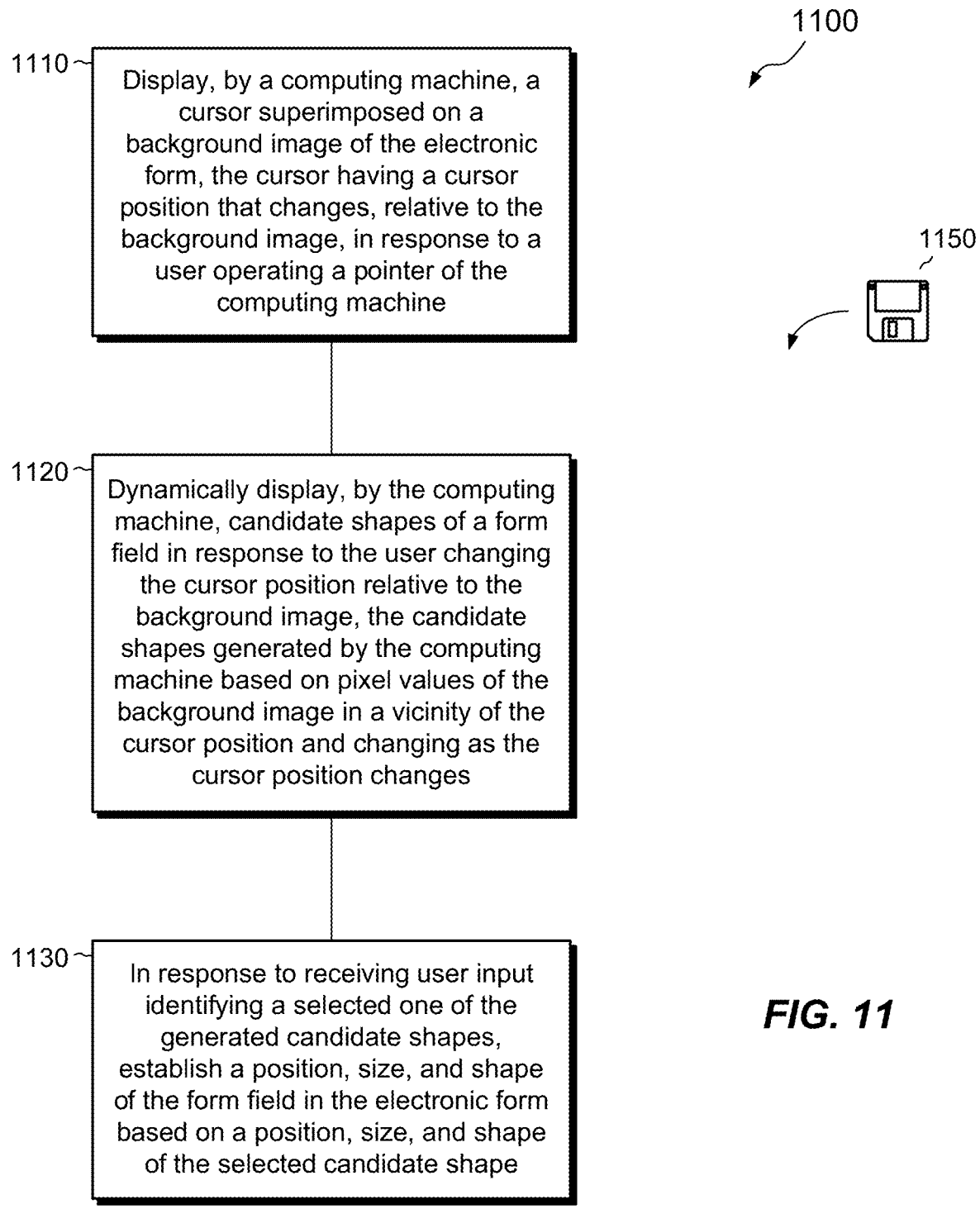
FIG. 11 is a flowchart showing an example method of providing one or more form fields in an electronic form.

FIG. 11 shows an example method 1100 that may be carried out in connection with the environment 100 of FIG. 1. The method 1100 is typically performed by the software constructs, described in connection with FIGS. 1 and 2, which reside in the memory 220 of the computing machine 110 and are run by the set of processors 210. The various acts of the process 1100 may be ordered in any suitable way. Accordingly, embodiments may be constructed in which acts are performed in orders different from that illustrated, which may include performing some acts simultaneously, even though the acts are shown as sequential in the illustrated embodiments.

At 1110, the computing machine 110 displays a cursor 330 superimposed on a background image 310 of an electronic form (e.g., form 180 being generated). The cursor 330 has a cursor position that changes, relative to the background image 310, in response to a user 112 operating a pointer 110*a* of the computing machine 110.

At 1120, the computing machine 110 dynamically displays candidate shapes (e.g., 510, 710, 910) of a form field in response to the user 112 changing the cursor position relative to the background image 310, the candidate shapes generated by the computing machine 110 based on pixel values of the background image 310 in a vicinity of the cursor position and changing as the cursor position changes.

At 1130, in response to receiving user input that identifies a selected one of the generated candidate shapes, the method includes establishing a position, size, and shape of the form field in the electronic form based on a position, size, and shape of the selected candidate shape.

An improved technique has been described for inserting form fields into forms. The technique displays a cursor 330 superimposed over a background image 310 of a form and dynamically displays candidate shapes of a form field to be inserted. New candidate shapes (e.g., 510, 710, 910) are generated automatically, based on pixel content of the form under a cursor 330, as a user 112 moves the cursor 330 over different regions of the form. In response to the user 112 manually selecting one of the candidate shapes, the technique establishes the position, size, and shape of the form field based on the position, size, and shape of the selected candidate shape. The improved technique thus proceeds semi-automatically, generating candidate shapes automatically but based on manual, user-directed cursor positioning and manual selections, thus allowing a user to avoid the tedium of manual field entry while also avoiding the errors associated with fully-automated field detection.

Having described certain embodiments, numerous alternative embodiments or variations can be made. For example, in the embodiments described above, displaying candidate shapes enables the user 112 to select a desired candidate shape based on visual inspection. However, displaying candidate shapes is not strictly required. For example, some embodiments may generate multiple candidate shapes prior to receiving a user selection but not display them. Instead, these embodiments simply insert the candidate shape that corresponds to the current cursor position when the user makes the selection.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 1150 in FIG. 11). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of providing one or more form fields in an electronic form, the method comprising:
   displaying, by a computing machine, a cursor superimposed on a background image of the electronic form, the background image providing a graphical representation of at least a portion of the electronic form, the cursor having a cursor position that changes, relative to the background image, in response to a user operating a pointer of the computing machine;
   dynamically displaying, by the computing machine, different candidate shapes of a form field one at a time in response to the user changing the cursor position relative to the background image, the candidate shapes generated by the computing machine based on pixel values of the background image under the cursor and changing as the cursor position changes; and
   in response to receiving user input that identifies a selected one of the generated candidate shapes, establishing a position, size, and shape of the form field in the electronic form based on a position, size, and shape of the selected candidate shape.

2. A method as recited in claim 1, wherein dynamically displaying candidate shapes includes displaying a first candidate shape that completely surrounds a current cursor position in response to detecting that the background image contains a bright pixel at the current cursor position, the bright pixel having a lightness that exceeds a predetermined lightness threshold.

3. The method as recited in claim 2, wherein dynamically displaying candidate shapes further includes displaying a second candidate shape immediately above the current cursor position in response to detecting that the background image contains a dark pixel at the current cursor position, the dark pixel having a lightness less than the predetermined lightness threshold.

4. The method as recited in claim 3, wherein the dark pixel is part of a horizontal line segment of the background image, the horizontal line segment having a length, and wherein, when displaying the second candidate shape, the second candidate shape has a width based on the length of the horizontal line segment.

5. The method as recited in claim 4, further comprising generating the second candidate shape by:
   testing pixels to the left of the current cursor position within a predetermined distance above and/or below the horizontal line segment to identify a left pixel that has a lightness value below the predetermined lightness threshold;
   testing pixels to the right of the current cursor position within the predetermined distance above and/or below the horizontal line segment to identify a right pixel that has a lightness value below the predetermined lightness threshold; and
   establishing the width of the second candidate shape based on a distance between the left pixel and the right pixel.

6. A method as recited in claim 5, wherein testing pixels to the left of the current cursor position is performed by a first computing thread running on the computing machine, and wherein testing pixels to the right of the current cursor position is performed by a second computing thread running on the computing machine.

7. The method as recited in claim 5, wherein, when displaying the second candidate shape, the computing machine displays the second candidate shape with a predetermined height.

8. The method as recited in claim 4, further comprising:
   displaying a first cursor image at the current cursor position in response to detecting that the background image contains a dark pixel at the current cursor position, the dark pixel having a lightness below the predetermined lightness threshold;

displaying a second cursor image at the current cursor position in response to detecting that the background image contains a bright pixel at the current cursor position, the bright pixel having a lightness that exceeds the predetermined lightness threshold; and switching between displaying the first cursor image and displaying the second cursor image as the user changes the current cursor position relative to the background image.

9. A method as recited in claim 8, further comprising, prior to displaying the first candidate shape, generating the first candidate shape by:

scanning the background image in a vicinity of the current cursor position to identify a two-dimensional region within which all scanned pixels of the background image have lightness values that exceed the predetermined lightness threshold; and establishing the first candidate shape as the identified two-dimensional region.

10. A method as recited in claim 9, wherein the two-dimensional region is a rectangle bounded on at least one side by a set of pixels of the background image that have lightness values less than the predetermined lightness threshold.

11. A method as recited in claim 10, wherein scanning the background image includes:

testing pixels extending away from the current cursor position in a first direction until a first found pixel is encountered, the first found pixel being the first pixel tested in the first direction that has a lightness value less than the predetermined lightness threshold;

testing pixels extending away from the current cursor position in a second direction until a second found pixel is encountered, the second found pixel being the first pixel tested in the second direction that has a lightness value less than the predetermined lightness threshold;

testing pixels extending away from the current cursor position in a third direction until a third found pixel is encountered, the third found pixel being the first pixel tested in the third direction that has a lightness value less than the predetermined lightness threshold;

testing pixels extending away from the current cursor position in a fourth direction until a fourth found pixel is encountered, the fourth found pixel being the first pixel tested in the fourth direction that has a lightness value less than the predetermined lightness threshold; and establishing boundaries of the first candidate shape based on locations of the first through fourth found pixels.

12. A method as recited in claim 11, wherein, for each of the first through fourth directions, testing pixels extending away from the current cursor position includes:

testing a first set of pixels that form a respective line segment extending away from the current cursor position in the respective direction; and testing a second set of pixels that are offset perpendicularly from the respective line segment within a predetermined distance from the respective line segment.

13. A method as recited in claim 12, wherein testing pixels in each of the first through fourth directions is performed by respective first through fourth computing threads operated on the computing machine, one thread for each direction.

14. A method as recited in claim 1, wherein dynamically displaying the candidate shapes of the form field includes (i) displaying an initial candidate shape in response to the user placing the cursor at an initial cursor position over the background image and (ii) automatically displaying a different candidate shape in place of the initial candidate shape in response to the user moving the cursor to a different cursor position over the background image.

15. A method as recited in claim 1, wherein displaying each of the candidate shapes includes generating and displaying a respective ghost image of the form field, each ghost image having boundaries that match boundaries of the form field to be inserted in response to the user selecting the respective candidate shape.

16. A computing machine, comprising control circuitry that includes a set of processors coupled to memory, the control circuitry constructed and arranged to:

display a cursor superimposed on a background image of an electronic form, the cursor having a cursor position that changes, relative to the background image, in response to a user operating a pointer of the computing machine;

dynamically display different candidate shapes of a form field one at a time in response to the user changing the cursor position relative to the background image, the candidate shapes generated based on pixel values of the background image under the cursor and changing as the cursor position changes; and in response to receiving user input that identifies a selected one of the generated candidate shapes, establish a position, size, and shape of the form field in the electronic form based on a position, size, and shape of the selected candidate shape.

17. A computer program product including a set of non-transitory, computer-readable media having instructions which, when executed by control circuitry of a computing machine, cause the control circuitry to perform a method for providing one or more form fields in an electronic form, the method comprising:

displaying, by the computing machine, a cursor superimposed on a background image of the electronic form, the cursor having a cursor position that changes, relative to the background image, in response to a user operating a pointer of the computing machine;

dynamically generating, by the computing machine, different candidate shapes of a form field one at a time in response to the user changing the cursor position relative to the background image, the candidate shapes generated by the computing machine based on pixel values of the background image under the cursor and changing as the cursor position changes; and in response to receiving a user input, establishing a position, size, and shape of the form field in the electronic form based on a position, size, and shape of a candidate shape generated based on the position of the cursor when the user input is received.

18. A computer program product as recited in claim 17, wherein dynamically generating candidate shapes includes generating a first candidate shape that completely surrounds a current cursor position in response to detecting that the background image contains a bright pixel at the current cursor position, the bright pixel having a lightness that exceeds a predetermined lightness threshold.

19. The computer program product as recited in claim 18, wherein dynamically generating candidate shapes further includes generating a second candidate shape immediately above the current cursor position in response to detecting that the background image contains a dark pixel at the current cursor position, the dark pixel having a lightness less than the predetermined lightness threshold.

20. The computer program product as recited in claim 19, wherein the dark pixel is part of a horizontal line segment of the background image, the horizontal line segment having a length, and wherein, when generating the second candidate shape, the second candidate shape has a width based on the length of the horizontal line segment.

21. The computer program product as recited in claim 20, wherein the method further comprises:
- displaying a first cursor image at the current cursor position in response to detecting that the background image contains a dark pixel at the current cursor position, the dark pixel having a lightness below the predetermined lightness threshold;
- displaying a second cursor image at the current cursor position in response to detecting that the background image contains a bright pixel at the current cursor position, the bright pixel having a lightness that exceeds the predetermined lightness threshold; and
- switching between displaying the first cursor image and displaying the second cursor image as the user changes the current cursor position relative to the background image.

22. A computer program product as recited in claim 21, wherein generating the first candidate shape includes:
- scanning the background image in a vicinity of the current cursor position to identify a two-dimensional region within which all scanned pixels of the background image have lightness values that exceed the predetermined lightness threshold; and
- establishing the first candidate shape as the identified two-dimensional region.

\* \* \* \* \*